United States Patent
Kling et al.

(10) Patent No.: US 6,757,814 B2
(45) Date of Patent: Jun. 29, 2004

(54) METHOD AND APPARATUS FOR PERFORMING PREDICATE PREDICTION

(75) Inventors: Ralph M. Kling, Sunnyvale, CA (US); Edward T. Grochowski, San Jose, CA (US); Hans J. Mulder, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/082,499

(22) Filed: Feb. 22, 2002

(65) Prior Publication Data

US 2002/0174326 A1 Nov. 21, 2002

Related U.S. Application Data

(63) Continuation of application No. 09/129,141, filed on Aug. 4, 1998.

(51) Int. Cl.[7] .................................................. G06F 9/38
(52) U.S. Cl. ................................... 712/234; 712/241
(58) Field of Search ................................ 712/233, 234, 712/235, 236, 237, 238, 239, 240, 241

(56) References Cited

U.S. PATENT DOCUMENTS

| | | | |
|---|---|---|---|
| 4,578,750 A | 3/1986 | Amdahl et al. | 364/200 |
| 4,967,351 A | 10/1990 | Zmyslowski et al. | 364/200 |
| 4,999,800 A | 3/1991 | Birger | 364/748 |
| 5,857,104 A | 1/1999 | Natarjan et al. | 395/705 |
| 5,903,750 A | 5/1999 | Yeh et al. | 395/583 |
| 6,009,512 A | * 12/1999 | Christie | 712/226 |
| 6,021,487 A | 2/2000 | Maliszewski | 712/221 |
| 6,115,808 A | 9/2000 | Arora | 712/219 |

FOREIGN PATENT DOCUMENTS

| | | | |
|---|---|---|---|
| EP | 0 855 645 A2 | 7/1998 | G06F/9/38 |
| WO | WO 97/48042 | 12/1997 | G06F/9/38 |
| WO | WO 98/08160 | 2/1998 | G06F/9/00 |
| WO | WO 99/14667 | 3/1999 | G06F/9/38 |

OTHER PUBLICATIONS

August et al., "Architectural Support for Compiler–Synthesized Dynamic Branch Prediction Strategies: Rationale and Initial Results", *Third International Symposium on High–Performance Computer Architecture*, IEEE, pp. 84–93, Feb. 1–5, 1997.*

Manne et al., "Pipeline Gating: Speculation Control for Energy Reduction", *Proceedings of the 25th Annual International Symposium on Computer Architecture*, IEEE, pp. 132–141, Jun. 27–Jul. 1, 1998.*

Pnevmatikatos et al., "Guarded Execution and Branch Prediction in Dynamic ILP Processors", *Proceedings of the 21st Annual International Symposium on Computer Architecture*, IEEE, pp. 120–129, Apr. 18–21, 1994.*

(List continued on next page.)

*Primary Examiner*—William M. Treat
(74) *Attorney, Agent, or Firm*—Blakely, Sokoloff, Taylor & Zafman LLP

(57) ABSTRACT

A method and apparatus for performing predicate prediction. In one method, both a predicted predicate value for a predicate and a confidence value for the predicted predicate value are determined.

10 Claims, 5 Drawing Sheets

OTHER PUBLICATIONS

Mahlke et al., "Characterizing the Impact of Predicated Execution on Branch Prediction," Proceedings of the 27th Annual International Symposium Microarchitecture, Micro–27, IEEE, pp. 217–227, Nov. 30–Dec. 2, 1994.*

Dulong, et al., *An Overview of the Intel ® IA–64 Compiler,* Technology Journal Q4, 1999, pp. 1–15.

Intel ® Itanium™ Architecture Software Developer's Manual, Part II: Optimization Guide for the Intel ® Itanium™ Architecture, *Predication, Control Flow, and Instruction Stream,* vol. 1: Application Architecture, Revision 2.0, Dec. 2001, pp. 1:129, 1:155–1:163.

Intel® Itanium™ Processor, Product Highlights, Copyright © 2001, Intel Corporation.

Tom R. Halfhill, *Beyond Pentium II,* BYTE.com, Dec. 1997, pp. 1–10.

Jim Turley, *64–Bit CPUs: What You Need To Know,* Extreme Tech, Feb. 8, 2002, pp. 1–26.

Nicholas P. Carter, ECE 412–Advanced Computer Architecture, Lecture 4: *Predication,* Sep. 13, 2000, pp. 1–27.

S.A. Mahika, "Effective Compiler Support for Predicated Execution Using the Hyperbolic", 1992 IEEE, pp. 45–54.

K.C. Tal et al., "Evaluation of a predicate –based software testing strategy", IBM Systems Journal, vol. 33, No. 3, pp. 445–457.

Jacobsen et al., "Assigning Confidence to Conditional Branch Predictions," *Proceedings of the 29th Annual IEEE/ACM International Symposium on Microarchitecture,* pp.142–152, Dec. 2–4, 1996.

Grunwald et al., "Confidence Estimation for Speculation Control" *Proceedings of the 25th Annual International Symposium on Computer Architecture,* pp. 122–131, Jun. 27–Jul. 2, 1998.

* cited by examiner

100

.

.

MOVE 5 → R(a)

COMPARE R(b), R(c) → p2

IF (p2) THEN MOVE 6 → R(a)

ADD R(a) + 5 → R(d)

.

.

METHOD AND APPARATUS FOR PERFORMING PREDICATE PREDICTION

This patent application is a continuation of patent application Ser. No. 09/129,141, filed Aug. 4, 1998.

FIELD OF THE INVENTION

The present invention relates to computer systems and more particularly to computer system processors that support predication and perform predicate prediction.

BACKGROUND OF THE INVENTION

A processor manipulates and controls the flow of data in a computer system. Increasing the speed of the processor will tend to increase the computational power of the computer. Processor designers employ many different techniques to increase processor speed to create more powerful computers for consumers. One technique for increasing processor speed is called predication.

Predication is the conditional execution of instructions depending on the value of a variable called a predicate. For example, consider the two instructions:

COMPARE a, b=P

IF (P) THEN c=a+b

The first instruction, COMPARE a, b=P, determines a value for the predicate P. For example, if a is equal to b, then the value of predicate P is "True", and if a is not equal to b, then the value of predicate P is "False." "True" and "False" are typically represented in a computer system as single bit values "1" and "0", respectively (or "0" and "1", respectively, in a negative logic implementation).

The second instruction, IF (P) THEN c=a+b, includes two parts. The first part, IF (P) THEN, predicates (or conditions) the second part, c=a+b, on the value of predicate P. If P is true (e.g. a "1"), then the value of c is set equal to the value of a+b. If P is false (e.g. a "0"), then the second part of the instruction is skipped and the processor executes the next sequential instruction in the program code.

Unfortunately, the compare instruction, COMPARE a, b=P, can take a lengthy amount of time to process. Because of this, the execution of subsequent instructions in the program code sequence may be delayed until the compare instruction is resolved.

SUMMARY OF THE INVENTION

A new method and apparatus for performing predicate prediction is described. In one method, both a predicted predicate value for a predicate and a confidence value for the predicted predicate value are determined.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
FIG. 1 is program code including a predicated instruction.

To increase processing speed, a processor may predict predicate values. A processor may use any of a variety of methods to predict a predicate value for a predicate, and the processor than uses the predicted predicate value to evaluate subsequent, predicated instructions. For example, assume the processor that executes the above program code predicts that predicate P is 1. The processor executes the predicated instruction, IF P THEN c=a+b, by assigning the value of a+b to c. The processor may then continue executing subsequent instructions in the program sequence before the compare instruction, COMPARE a, b=P, completes execution.

Once the compare instruction is executed, the actual predicate value may be determined. If the actual predicate value is equal to the predicted predicate value used by the processor, the prediction may be deemed correct and the processor may continue executing the remaining program code normally. If the actual predicate value is not equal to the predicted predicate value used by the processor, the prediction may be deemed incorrect. In the event of an incorrect prediction, the processor may back up to the predicated instruction, IF P THEN c=a+b, and re-execute subsequent instructions (or at least those instructions that are dependent on the predicated instruction) using the actual predicate value. Re-executing these instructions may result in a time delay and, consequently, performance degradation of the processor. This time delay may be referred to as the recovery time for a mispredicted predicate, and the delay may be longer than the amount of delay the processor would otherwise have experienced had it never attempted to predict the predicate in the first place.

It may be important, therefore, to predict predicates as accurately as possible so recovery time penalties do not exceed predicate prediction time savings. Sometimes a predicate may be predicted with great accuracy. For example, when the actual predicate value of a particular predicate is "0" the last five times an instruction is executed, chances may be good that a predicted predicate value of "0" will be accurate the sixth time the instruction is executed. In contrast, sometimes a predicate may not be predicted with much accuracy. For example, when the actual predicate value of a particular predicate is randomly either "0" or "1" the last five times an instruction is executed, chances may not be much better than 50% that a predicted predicate value of "0" will be accurate the sixth time the instruction is executed.

A method and apparatus for performing predicate prediction is described in which a predicate is predicted when the confidence in the accuracy of the prediction is high, and the predicate is not predicted when confidence is low. The predicate predictor that implements an embodiment of this invention includes a predicate table having two entries per predicate. The first entry is a predicted predicate value for the predicate and the second entry is a confidence value for the predicted predicate value. The predicate predictor further includes output and input circuitry coupled to the predicate table. The output circuitry evaluates the confidence value and determines if a predicate should be predicted. The input circuitry updates the predicted predicate and confidence values based on previous predicted predicate and confidence values and actual predicate values evaluated by the processor.

In one method of the present invention, the predicted predicate and confidence values corresponding to the predicate of a fetched predicated instruction are read from the predicate table. If the confidence value has a predetermined logical relationship to a predetermined value, no prediction is made. Instead, the execution of the instruction is stalled until the actual predicate value is determined. For example, if the confidence value is less than a particular value, it indicates a low confidence level in the predicted predicate value. In response, a pipeline of the processor is stalled until the actual predicate value is determined. If the confidence value is greater than or equal to the predetermined value, indicating a high confidence level in the predicted predicate value, a prediction is made using the predicted predicate value, and execution of the instruction continues normally.

After the instruction that determines the actual predicate value completes execution, the resulting actual predicate value is compared to the predicted predicate value. If the prediction was correct, the confidence value corresponding to the predicate is modified in the predicate table by increasing (or decreasing in an inverted implementation) the confidence value, if not already saturated, to indicate increased confidence in the predicted predicate value. If the prediction was incorrect, the confidence value is modified in the predicate table, if not already saturated, to indicate decreased confidence in the predicted predicate value. In this manner, the confidence value tracks correct and incorrect predictions for the predicate made by the predicate predictor. For one embodiment of the present invention, the actual predicate value is also used to update the predicted predicate value in the predicate table.

A more detailed description of embodiments of the present invention, including various configurations and implementations, is provided below.

FIG. 1 is program code 100 including four instructions. The first instruction, MOVE 5→R(a), inserts the value 5 into register R(a). The next instruction, COMPARE R(b), R(c) →p2, compares the value in register R(b) with the value in register R(c) and, if the values are equal, stores a value of 1 (True) in a predicate table for predicate p2. Otherwise, if the value in register R(b) is not equal to the value in register R(c), a value of 0 (False) is stored in the predicate table for predicate p2. The next instruction, IF (p2) THEN MOVE 6→R(a), inserts the value 6 into register R(a) if p2 is 1, and otherwise does nothing if p2 is 0. The last instruction, ADD R(a)+5→R(d), inserts the value of 5 plus the value in register R(a) into register R(d).

Instruction IF (p2) THEN MOVE 6→R(a) of FIG. 1 is a predicated instruction, the execution of which is predicated on the value of predicate p2. If p2 is 1 (i.e. the value in register R(b) is equal to the value in register R(c)), then the value in register R(d) is 11. If p2 is 0, then the value in register R(d) is 10. In accordance with one embodiment, the COMPARE instruction takes three clocks to complete and the IF-THEN and ADD instructions take one clock each. Given these conditions, the IF-THEN and ADD instructions following the COMPARE instruction can be executed before the COMPARE instruction completes if the value of predicate p2 can be predicted. Unfortunately, if p2 is incorrectly predicted, the recovery time may take, for example, ten or more clocks. Therefore, it is important that p2 be predicted only if there is a high likelihood that the prediction will be correct. Otherwise, it is best to wait the three clocks until the COMPARE instruction completes and the actual predicate value for p2 is determined before executing the IF-THEN and ADD instructions.

If the four instructions in the program code 100 of FIG. 1 are contained in a loop, the processor may fetch these instructions many times. After the predicated IF-THEN instruction is fetched, its controlling predicate, p2, is looked up in a predicate table where corresponding predicted predicate and confidence values are read. These values are used by a predicate predictor to make good prediction decisions, and, if necessary, to modify the table entries so that better prediction decisions are made the next time the instruction is re-fetched. The predicate predictor operates according to the state diagram of FIG. 2.

Figure 2:
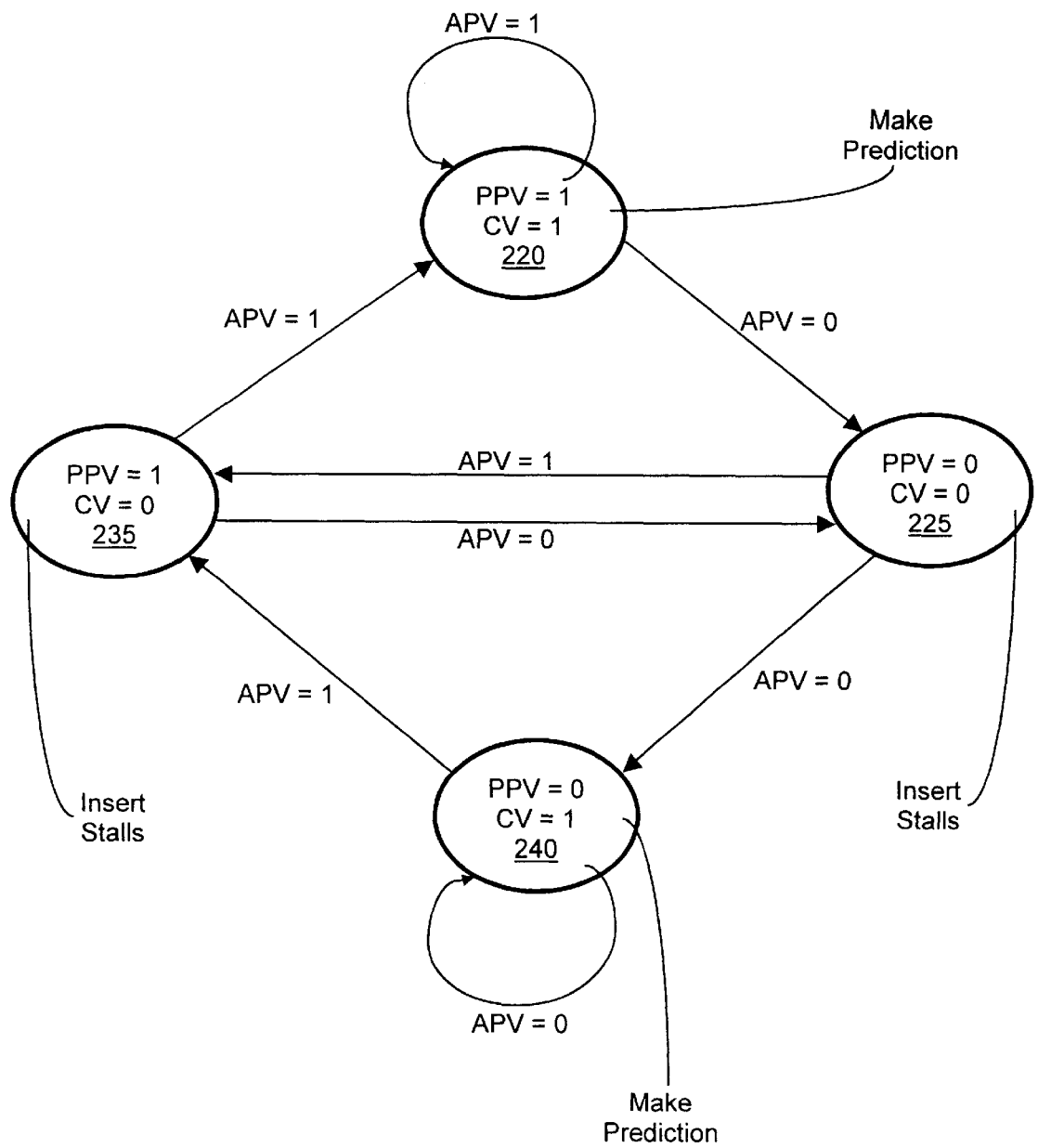
FIG. 2 is a state diagram for predicate prediction in accordance with an embodiment of the present invention.

FIG. 2 is a state diagram for predicate prediction in accordance with an embodiment of the present invention in which four states are defined. In state 220, the predicted predicate value (PPV) in the predicate table corresponding to the desired predicate (p2 in the case of the program code sequence of FIG. 1) is 1. The confidence value (CV) for this PPV, also in the predicate table corresponding to the desired predicate, is 1. For this embodiment of the present invention, a CV of 1 indicates a high confidence in the accuracy of the PPV, so the predicate is predicted to be the PPV of 1. If the actual predicate value (APV) is determined to be 1 after executing the COMPARE instruction that calculates the predicate value, then the prediction is correct, and the high CV of 1 for the PPV of 1 is maintained.

If, however, the APV is determined to be 0, then the prediction is incorrect and the state machine transitions to state 225 of FIG. 2. Note that the incorrect prediction results in a recovery delay including a pipeline flush and re-execution of the instruction predicated on the incorrectly predicted predicate. In addition, any subsequent instructions that relied directly or indirectly on the incorrectly predicted predicate are flushed and re-executed.

In state 225 of FIG. 2 the CV is lowered to 0, indicating less confidence in the PPV, and the PPV is modified by setting its value to the previously calculated APV of 0. The CV and PPV are entered back into the predicate table at the location corresponding to the incorrectly predicted predicate. In accordance with the embodiment of FIG. 2, a CV of 0 tells the processor that the odds that the PPV is accurate are very low. So low, in fact, that it would be better to wait until the APV is determined by, for example, completing execution of a COMPARE instruction rather than using the PPV to predict the predicate and possibly suffer a significant recovery delay. For this reason, the predicate predictor sends a signal to the instruction scheduling and execution units of the processor. In response, pipeline stalls are inserted until the APV is determined. Once the APV is determined, the APV is used to resolve the predication, and instruction execution proceeds normally.

For an alternate embodiment of the present invention, instead of inserting pipeline stalls until the APV is determined, stalls are inserted for a predetermined period of time. This embodiment may be found useful in applications in which it is already known how long (i.e. how many clocks) it takes to determine the APV for most applications. In accordance with this embodiment of the present invention, this predetermined period of time is less than the recovery time for a mispredicted predicate.

If the predicate predictor is in state 225 of FIG. 2 and an APV is determined to be 1, the predicate predictor transitions to state 235. In state 235, the CV remains 0, indicating low confidence in the PPV, and the PPV is modified by setting its value to the previously calculated APV of 1. The CV and PPV are entered back into the predicate table at the location corresponding to the incorrectly predicted predicate. In accordance with the embodiment of FIG. 2, the CV of 0 tells the processor that the odds that the PPV is accurate are very low. Therefore, the predicate predictor sends a signal to the instruction scheduling and execution units of the processor. In response, pipeline stalls are inserted until the APV is determined. Once the APV is determined, the APV is used to resolve the predication, and instruction execution proceeds normally.

Once in state 235, if an APV is determined to be 1, the predicate predictor transitions back to state 220 described above, and the CV is raised to 1 while the PPV remains unchanged. If, on the other hand, the APV is determined to be 0, the predicate predictor transitions back to state 225.

If the predicate predictor is in state 225 of FIG. 2 and an APV is determined to be 0, the predicate predictor transitions to state 240. In state 240, the CV is raised to 1 and the PPV is set to 0. The CV of 1 indicates a high confidence in the PPV. The CV and PPV are entered back into the predicate table at the locations corresponding to the predicate. When the predicate predictor is in state 240, predictions are made for the predicate in a corresponding position in the predicate table using a PPV of 0. If, after predicting a PPV of 0, the APV is determined to be 1, the predicate predictor transitions to state 235, described above, whereupon the CV is lowered to 0 and the PPV is set to the calculated APV of 1. If, however, the APV is determined to be 0, the predicate predictor remains in state 210:

For an alternate embodiment of the present invention, additional stall states or prediction states are inserted into the state machine of the predicate predictor. One such embodiment is described below in conjunction with FIG. 4. For another embodiment, the CV and PPV are determined independently of one another. In accordance with an alternate embodiment of the present invention, inverted logic is used in which a lower CV indicates a higher confidence in the PPV, and vice-versa. In addition, an alternate algorithm may be implemented to determine the PPV other than the above-described algorithm in which a subsequent PPV is simply set to it's immediately preceding APV.

Figure 3:
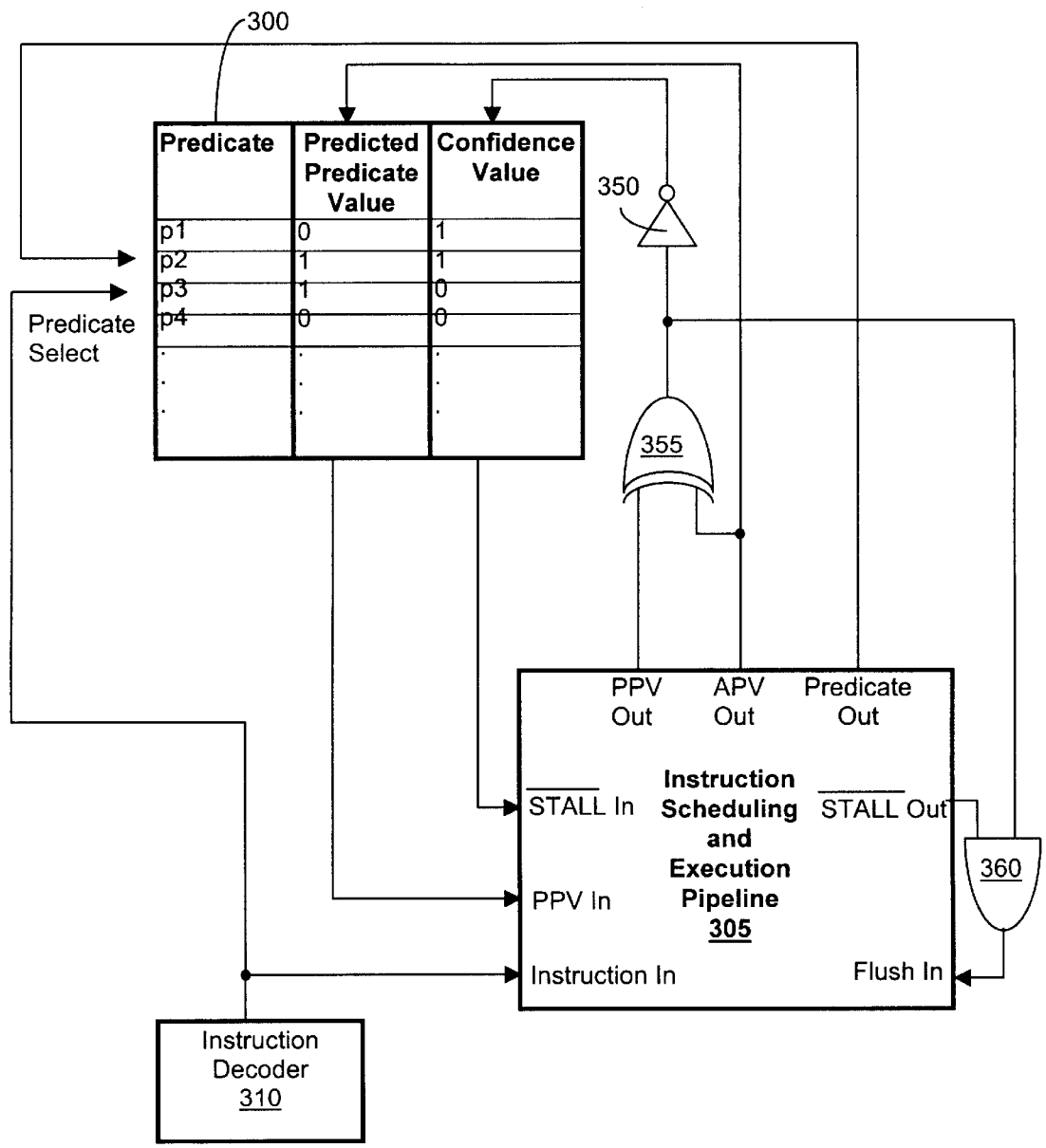
FIG. 3 is a predicate predictor implementing the state diagram of FIG. 2.

FIG. 3 is a predicate predictor implementing the state diagram of FIG. 2. Predicate table 300 includes PPV entries and CV entries, each corresponding to a predicate. The output of the PPV portion of table 300 is coupled to the PPV input of instruction scheduling and execution pipeline 305. The output of the CV portion of table 300 is coupled to the inverted STALL input of pipeline 305. The output of instruction decoder 310 is coupled to the instruction input of pipeline 305 as well as to predicate select circuitry (e.g. a multiplexer) coupled to predicate table 300. The PPV and APV outputs of pipeline 305 are coupled to inputs of XOR gate 355. In addition, the APV output of pipeline 305 is coupled to the input of the PPV portion of predicate table 300. The predicate output of pipeline 305 is coupled to the predicate select circuitry of predicate table 300. The output of XOR gate 355 is coupled to the input of the CV portion of predicate table 300 via inverter 350. The output of XOR gate 355 is also coupled to an input of AND gate 360. The inverted STALL output of pipeline 305 is coupled to the other input of AND gate 360, the output of the AND gate being coupled to the flush signal input to pipeline 305.

To demonstrate the operation of the predicate predictor of FIG. 3, consider the execution of program code 100 of FIG. 1. After the processor fetches the instruction COMPARE R(b), R(c)→p2, the instruction is decoded in instruction decoder 310 and is executed in instruction scheduling and execution pipeline 305 of FIG. 3. After the processor fetches the instruction IF (p2) THEN MOVE 6→R(a), the instruction is decoded in instruction decoder 310. Predicate p2 is extracted from the decoded instruction and forwarded from instruction decoder 310 to the predicate select circuitry of predicate table 300. The PPV of 1 and CV of 1 corresponding to p2 are read. This corresponds to state 220 of FIG. 2. The decoded instruction is also forwarded from instruction decoder 310 to the instruction input to pipeline 305.

The PPV of 1 is forwarded to the PPV input of pipeline 305 in FIG. 3 and the CV of 1 is forwarded to the inverted STALL input of pipeline 305. The STALL signal, therefore, is 0, indicating that pipeline 305 is not to be stalled (i.e. a prediction is to be made using PPV). Within pipeline 305, the IF-THEN instruction is evaluated predicting that p2 is true. As a result, the value of 6 is moved into register R(a). The subsequent instruction, ADD R(a)+5→R(d), is decoded by decoder 310 and forwarded to pipeline 305 where it is executed. Hence, 11 (R(a) plus 5), is inserted into register R(d).

After these instructions are executed in pipeline 305 of FIG. 3, the COMPARE instruction completes, and the APV is determined and forwarded to an input of XOR gate 355 and to the PPV input of predicate table 300. The PPV of 1 for p2 is also forwarded to an input of XOR gate 355. If the APV for p2 is equal to 1 (i.e. the value in register R(b) is equal to the value in register R(c)), then the output of XOR gate 355 is 0. This 0 is inverted to a 1 and is provided to the CV input of predicate table 300. The 1 is entered into the table for the CV entry corresponding to p2. The APV of 1 is also entered into the table for the PPV entry corresponding to p2. The output of XOR gate 355 of 0 is also provided to an input of AND gate 360, ensuring that the output of this gate is also 0, resulting in no flush of pipeline 305.

If, instead, the APV for p2 is equal to 0 ((i.e. the value in register R(b) is not equal to the value in register R(c)), then the output of XOR gate 355 of FIG. 3 is 1. This 1 is inverted to a 0 and is provided to the CV input of predicate table 300. The 0 is entered into the table for the CV entry corresponding to p2. The APV of 0 is also entered into the table for the PPV entry corresponding to p2. The output of XOR gate 355 of 1 is provided to an input of AND gate 360. The inverted stall output from pipeline 305, which is also 1, is provided to the other input of AND gate 360. As a result, the output of the AND gate is 1, and this 1 is provided to the flush input to pipeline 305, causing the pipeline to flush and re-execute the predicated IF-THEN instruction along with any subsequently executed dependent instructions.

The PPV of 0 and CV of 0 entered into predicate table 300 for predicate p2 corresponds to a transition to state 225 of FIG. 2. A subsequent use of predicate p2 would result in stalling the execution of the instruction predicated on p2 until its APV is determined, and a transition to either state 235 if the APV is determined to be 1 or state 240 if the APV is determined to be 0.

For an alternate embodiment of the present invention, the PPV and CV entries corresponding to each predicate in the predicate table are unified such that a PPV and a CV can be determined from a single entry in the table. For another embodiment, each PPV or CV entry includes 2 or more bits to accommodate, for example, more sophisticated predicate prediction techniques or additional confidence states.

Figure 4:
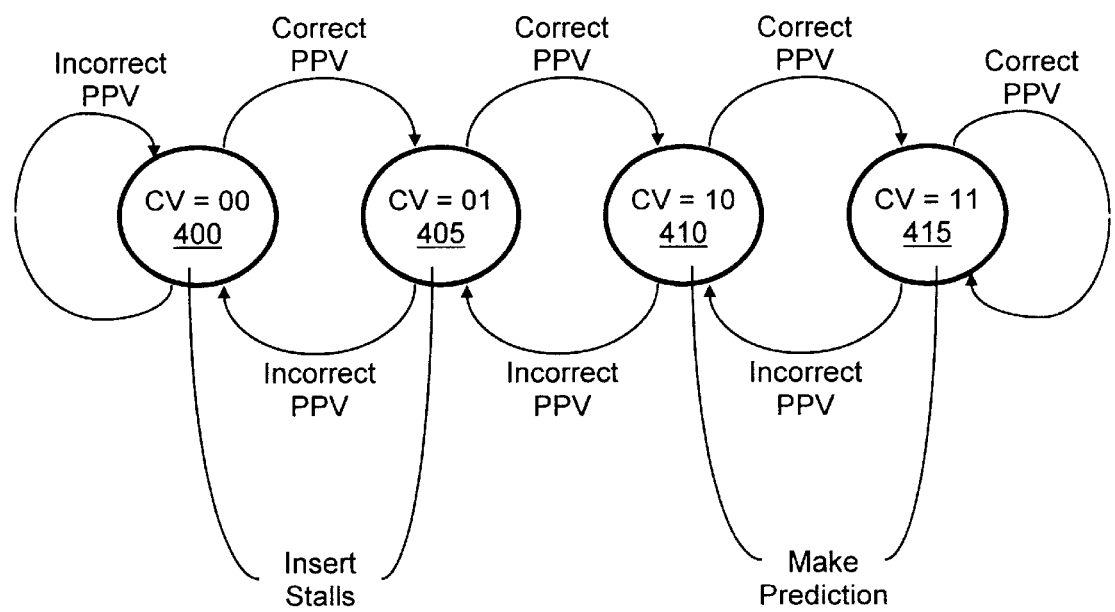
FIG. 4 is a state diagram for predicate prediction in accordance with an alternate embodiment of the present invention.

FIG. 4 is a state diagram for predicate prediction in accordance with an alternate embodiment of the present invention in which additional confidence states are implemented and the PPV calculation is independent of CV calculation. This embodiment may be implemented using a counter to modify the CV wherein the CV is incremented with every correct prediction (the PPV is equal to the APV for a particular predicate) and is decremented with every incorrect prediction (the PPV is not equal to the APV for a particular predicate) with saturation at both ends.

In state 400 of FIG. 4, the CV is 00. For this embodiment, a CV of 00 indicates a very low confidence in the PPV. As a result, stalls are inserted in the processor pipeline until the APV is calculated by execution of, for example, a COMPARE instruction. Once the APV is determined, it is compared to the PPV stored in the predicate prediction table. If the APV is not equal to the PPV, the PPV is deemed to be "incorrect" (even though no actual prediction was made), and the predicate predictor remains in state 400 for the particular predicate. If, however, the APV is equal to the PPV, the PPV is deemed to be "correct", and the predicate predictor transitions to state 405, incrementing the CV to 01.

In state 405 of FIG. 4, the CV is 01. For this embodiment, a CV of 01 indicates a low confidence in the PPV. As a result, stalls are inserted in the processor pipeline until the APV is calculated. After the APV is determined, it is compared to the PPV stored in the predicate table. If the APV is not equal to the PPV, the PPV is incorrect and the predicate predictor transitions back to state 400, decrementing the CV to 00. If, however, the APV is equal to the PPV, the PPV is correct, and the predicate predictor transitions to state 410, incrementing the CV to 10.

In state 410 of FIG. 4, the CV is 10 and, for this embodiment, a CV of 10 indicates a sufficiently high confidence in the PPV. As a result, a prediction is made that the predicate is equal to the PPV. After the APV is determined, it is compared to the PPV. If the APV is not equal to the PPV, the PPV is incorrect and the predicate predictor transitions back to state 405, decrementing the CV to 00. In addition, the processor must recover from the incorrect prediction, as explained above. If, however, the APV is equal to the PPV, the PPV is correct, and the predicate predictor transitions to state 415, incrementing the CV to 11.

In state 415 of FIG. 4, the CV is 11 and, for this embodiment, a CV of 11 indicates a high confidence in the PPV. As a result, a prediction is made that the predicate is equal to the PPV. After the APV is determined, it is compared to the PPV. If the APV is not equal to the PPV, the PPV is incorrect and the predicate predictor transitions back to state 410, decrementing the CV to 10. In addition, the processor must recover from the incorrect prediction, as explained above. If, however, the APV is equal to the PPV, the PPV is correct, and the predicate predictor remains in state 415. The embodiment of FIG. 4, in comparison to FIG. 2, tolerates occasional mispredictions while allowing predictions to continue.

Figure 5:
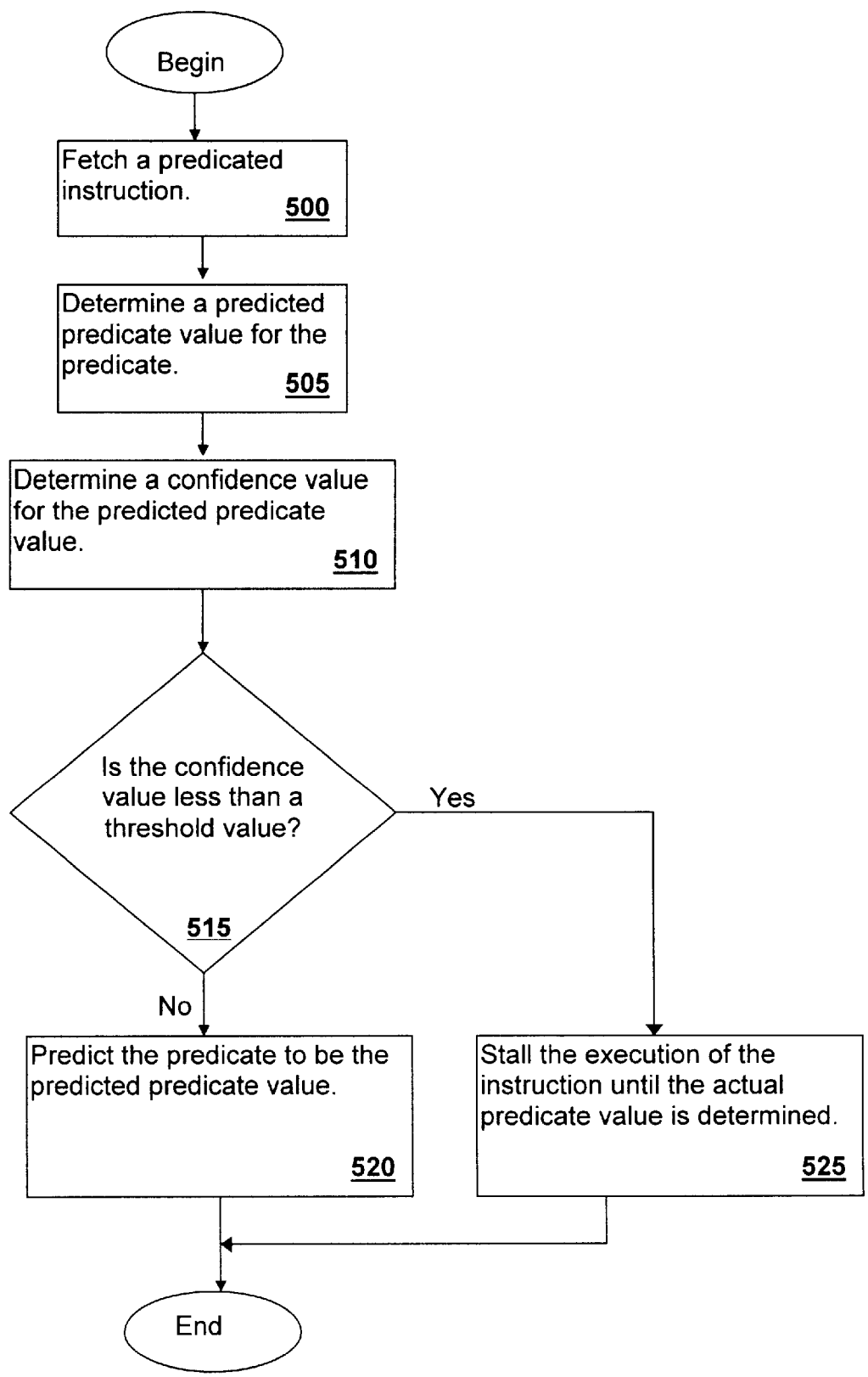
FIG. 5 is a flow chart showing a method of the present invention.

FIG. 5 is a flow chart showing a method of the present invention. At step 500 a predicated instruction is fetched. The instruction is predicated on a predicate. At step 505 a predicted predicate value is determined for the predicate. This predicted predicate value may be determined by reading a PPV entry from a predicate table in a position corresponding to the predicate, or by reading some other entry corresponding to the predicate and calculating the PPV therefrom. At step 510 a confidence value is determined for the predicted predicate value. This confidence value may be determined by reading a CV entry from a predicate table in a position corresponding to the predicate, or by reading some other entry corresponding to the predicate and calculating the CV therefrom. In accordance with one embodiment of the present invention, steps 505 and 510 are performed in parallel.

At step 515 of FIG. 5, it is determined if a confidence value is less than a particular threshold value. The threshold value may be predetermined by a processor designer and hardwired into the processor through the use of logic circuits coupled to a predicate table. Alternatively, the threshold value may be programmed by a user-of the processor or may be dynamically adjusted by additional logic.

If the confidence value is less than the threshold value, the execution of the instruction is stalled at step 525 until the actual predicate value is determined. If, however, the confidence value is not less than the threshold value (i.e. it is greater than or equal to the threshold value), then the predicate is predicted to be the predicted predicate value at step 520.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method comprising:

accessing a first entry corresponding to a first predicate in a table;

predicting the first predicate to be a first predicted predicate value in response to accessing the first entry;

creating a modified first entry in the table if it is determined that the first predicted predicate value is incorrect;

accessing the modified first entry corresponding to the first predicate in the table;

stalling execution of first instruction that is predicated on the first predicate in response to accessing the modified first entry; and fetching the first instruction before accessing the first entry, and re-fetching the first instruction after creating the modified first entry and before accessing the modified first entry.

2. The method of claim 1, further comprising:

accessing a second entry corresponding to a second predicate in the table; predicting the second predicate to be a second predicted predicate value in response to accessing the second entry;

creating a modified second entry in the table if it is determined that the second predicted predicate value is incorrect;

accessing the modified second entry corresponding to the second predicate in the table; and stalling execution of a second instruction that is predicated on the second predicate in response to accessing the modified second entry.

3. The method of claim 1, wherein accessing the first entry comprises:

searching for the first predicate in the table; and reading a first confidence value corresponding to the first predicted predicate value.

4. The method of claim 3, wherein creating the first entry comprises changing the first confidence value.

5. The method of claim 1, wherein predicting comprises:

searching for the first predicate in the table;

reading a first predicted predicate value corresponding to the first predicate in the table; and conditionally executing the first instruction depending on the first predicted predicate value.

6. A processor comprising:

a first circuit to access a first entry corresponding to a first predicate in a table, the first circuit to create a modified first entry in the table if the first predicted predicate value is determined incorrect, and the first circuit to access the modified first entry corresponding to the first predicate in the table; and a second circuit to stall execution of a first instruction that is predicated on the first predicate in response to accessing the modified first entry, wherein the first instruction is fetched before accessing the first entry, and the first instruction is re-fetched after creating the modified first entry and before accessing the modified first entry.

7. The processor of claim 6, wherein the first circuit is to access a second entry corresponding to a second predicate in the table and to create a modified second entry in the table if the second predicted predicate value is determined incorrect, and the first circuit is to access the modified second entry corresponding to the second predicate in the table; and the second circuit is to tall execution of a second instruction that is predicated on the second predicate in response to accessing of the modified second entry.

8. The processor of claim 6, wherein the first circuit accessing the first entry includes searching for the first predicate in the table, and reading a first confidence value corresponding to the first predicted predicate value.

9. The processor of claim 8, wherein the first circuit is to create the first entry by modifying the firs confidence value.

10. The processor of claim 6, wherein the second circuit is to stall until an actual predicate value is determined for the first predicate.

* * * * *

UNITED STATES PATENT AND TRADEMARK OFFICE
CERTIFICATE OF CORRECTION

PATENT NO. : 6,757,814 B2
DATED : June 29, 2004
INVENTOR(S) : Kling et al.

It is certified that error appears in the above-identified patent and that said Letters Patent is hereby corrected as shown below:

Column 10,
Line 4, delete "tall" and insert -- stall --.
Line 13, delete "firs" and insert -- first --.

Signed and Sealed this

Fourteenth Day of September, 2004

JON W. DUDAS
*Director of the United States Patent and Trademark Office*